(12) United States Patent
Cleghorn et al.

(10) Patent No.: US 8,251,253 B1
(45) Date of Patent: Aug. 28, 2012

(54) PIVOTING COLLAPSIBLE ELECTRICAL DEVICE COVER

(75) Inventors: Richard L. Cleghorn, Tempe, AZ (US); Jeffrey P. Baldwin, Phoenix, AZ (US); Marcus J. Shotey, Scottsdale, AZ (US); Kenneth C. Booth, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 398 days.

(21) Appl. No.: 12/618,522

(22) Filed: Nov. 13, 2009

Related U.S. Application Data

(63) Continuation-in-part of application No. 12/366,276, filed on Feb. 5, 2009, now Pat. No. 8,104,639.

(60) Provisional application No. 61/114,420, filed on Nov. 13, 2008, provisional application No. 61/114,411, filed on Nov. 13, 2008.

(51) Int. Cl.
 *B65D 51/04* (2006.01)
 *H02G 3/08* (2006.01)
 *H01H 9/02* (2006.01)

(52) U.S. Cl. ......... 220/844; 220/3.7; 220/3.8; 220/4.02; 220/836; 220/843; 174/50; 174/58; 174/66; 174/67

(58) Field of Classification Search ................... 220/3.7, 220/3.8, 4.02, 836, 843, 844; 174/50, 58, 174/66, 67
See application file for complete search history.

(56) References Cited

U.S. PATENT DOCUMENTS 7,511,219 B2 * 3/2009 Dinh et al. ............... 174/66
7,820,912 B1 * 10/2010 Shotey et al. ............ 174/67
8,104,639 B1 * 1/2012 Cleghorn et al. ......... 220/844
* cited by examiner

*Primary Examiner* — Anthony Stashick
*Assistant Examiner* — Madison L Wright
(74) *Attorney, Agent, or Firm* — Booth Udall, PLC

(57) ABSTRACT

An electrical device cover comprises a base with an opening in a back wall of the base sized to receive an electrical device and a lid coupled to the base at a first base end through a hinge, the lid pivotable between and open position and at least one closed position. The base comprises a notch on a base wall extending away from the first base end. A first lid end is hingedly coupled to the first base end such that the first lid end is selectively adjustable with respect to the base toward and away from the second base end. A lid pin extends from the lid towards the notch when the lid is in at least one closed position wherein the lid pin seats in the notch when the first lid end is selectively adjusted toward the second base end.

25 Claims, 20 Drawing Sheets

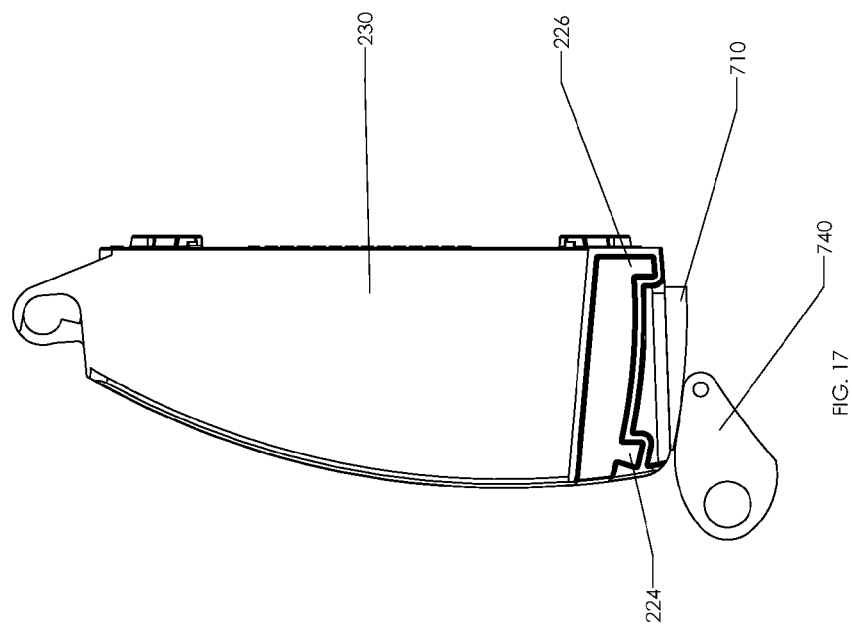
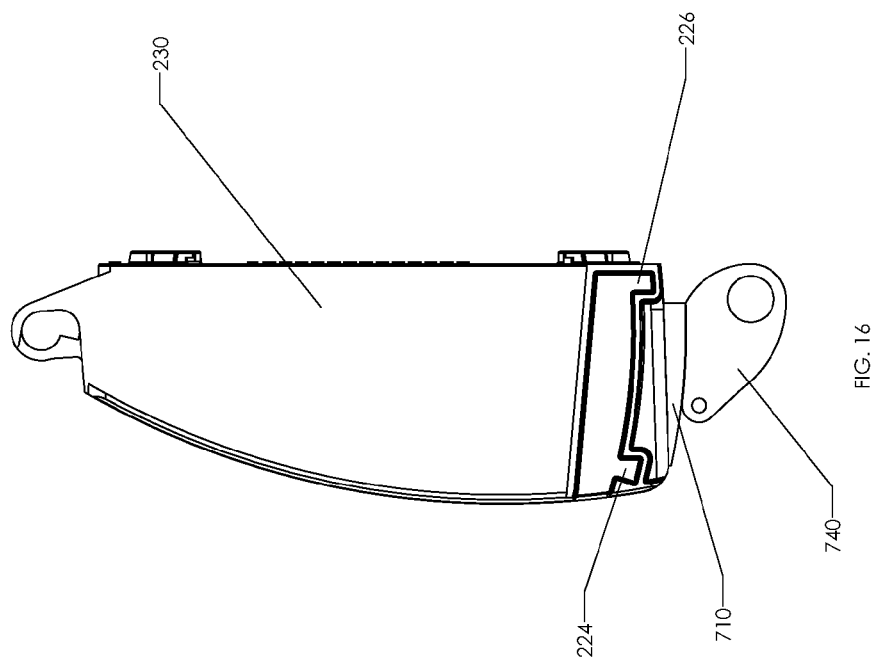

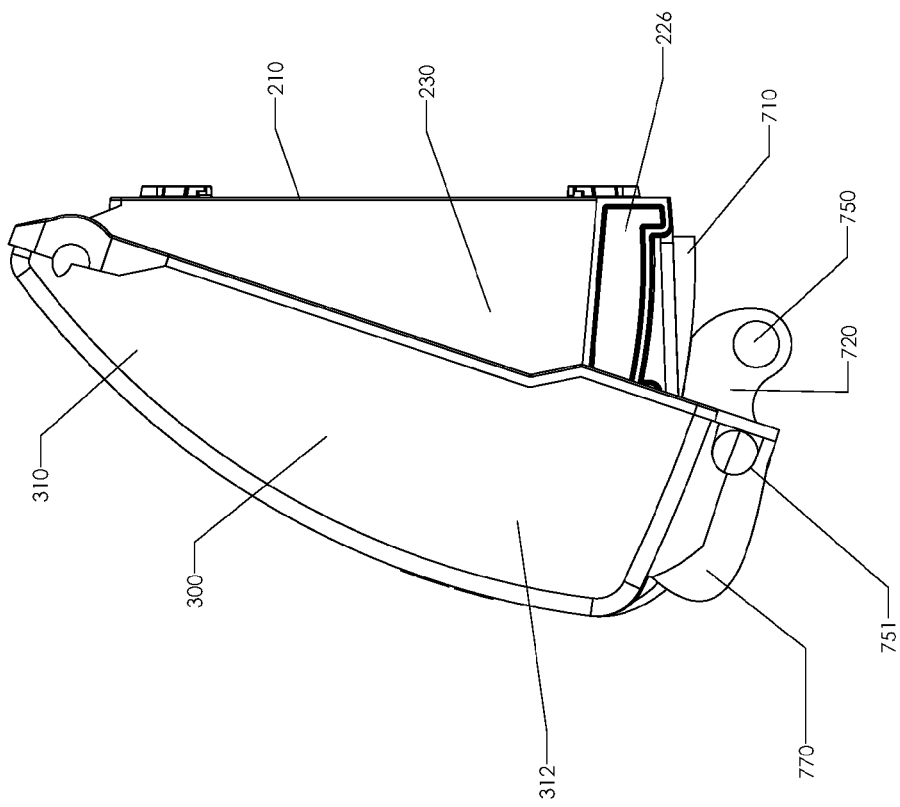
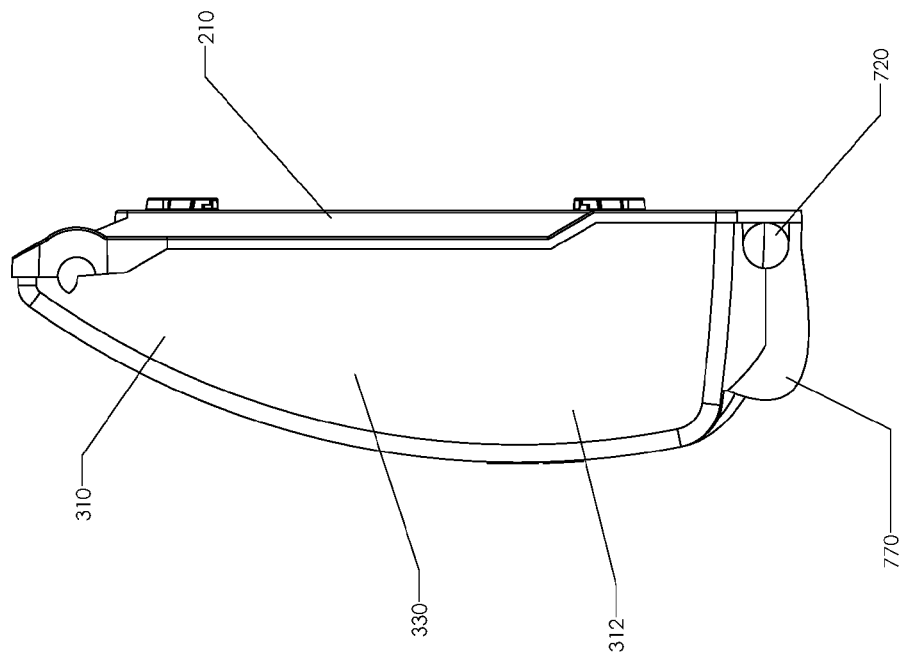

PIVOTING COLLAPSIBLE ELECTRICAL DEVICE COVER

CROSS REFERENCE TO RELATED APPLICATIONS

This document is a continuation-in-part application of U.S. patent application Ser. No. 12/366,276 to Richard Cleghorn, et al which was filed on Feb. 5, 2009 entitled "Pivoting Collapsing Electrical Device Cover", and claims the benefit of the filing date of U.S. Provisional Patent Application 61/114,420, entitled "Electrical Weatherproof Cover" to Richard Cleghorn, et al. which was filed on Nov. 13, 2008 and U.S. Provisional Patent Application 61/114,411, entitled "Hinged Enclosure" to Richard Cleghorn, et al. which was filed on Nov. 13, 2008, the contents of each of which are hereby incorporated herein by reference.

BACKGROUND

1. Technical Field

Aspects of this document relate generally to electrical device covers.

2. Background Art

Electrical device covers are conventionally used to protect electrical devices from water and other contaminants, prevent access to electrical wires, and/or provide a particular decorative look to an installed electrical device. Conventional electrical device covers may include a variety of components, such as bases and lids, and may be mounted in a variety of orientations, such as horizontal or vertical. Electrical device covers may be used in a variety of locations, including interior/exterior walls or recessed within a wall or other structure.

SUMMARY

In an aspect, an electrical device cover may comprise a base configured to mount to an electrical box, the base comprising an opening in a back side large enough to receive an electrical device, the base further comprising a first base end and a second base end and a notch on a base wall at or near the second base end and at or near a front opening of the base, the notch extending away from the first base end. The lid may comprise a lid pin extending toward the notch on the base wall when the lid is in at least one closed position in relation to the base, the lid may further comprise a first lid end and a second lid end. The first lid end may be hingedly coupled to the first base end through a hinge configured such that the first end of the lid is selectively adjustable with respect to the base toward and away from the second base end. The lid may be pivotable through the hinge with respect to the base between an open position and at least one closed position, and wherein in the at least one closed position the lid pin may seat in the notch on the base wall when the first end of the lid is selectively adjusted toward the second base end.

Particular implementations may include one or more of the following. The notch may comprise a first notch wall and a second notch wall extending away from the base wall wherein at least one of the notch walls occupies a plane that is non-parallel to the back side of the base. There may be a second notch on the base wall at or near the second base end and the back wall of the base wherein the lid pin seats adjacent to the second notch on the base wall when the first end of the lid is selectively adjusted toward the second base end and the lid is in a collapsed position. The lid pin may seat between the second notch and the back side of the base when the first end of the lid is selectively adjusted toward the second base end and the lid is in a collapsed position. The lid may be latched such that it is restricted from moving to the open position when the lid pin is seated in a notch on the base wall. A locking tab may extend away from the base, wherein the position of the locking tab is slidably adjustable along a channel on the base. A rotatable locking tab may extend away from the base, wherein the position of the rotatable locking tab is adjusted by rotating the locking tab relative to an initial position. The rotatable lock tab may be adjusted by rotating the locking tab 180 degrees relative to the initial position. One or more notches on the base wall may be configured such that the end of the notch located farthest from the first base end is open. There may be a track between the notch and the back side of the base.

In another aspect, an electrical device cover may comprise a base configured to mount to an electrical box, the base comprising an opening in a back side large enough to receive an electrical device, the base further comprising a first base end. The lid may comprise a first lid end and a second lid end wherein the first lid end is hingedly coupled to the first base end through a hinge. An adjustable locking tab may be adjustably coupled to the base and may be configured to lock the lid and base together at an expanded closed position relative to the base and at a collapsed closed position relative to the base.

Particular implementations may include one or more of the following. The adjustable locking tab may be rotatable relative to an initial position. For example, the adjustable locking tab may be rotatable 180 degrees relative to the initial position. The adjustable locking tab may be slidably adjustable along a channel on the bottom wall of the base. The adjustable locking tab may further comprise two openings therethrough, each opening large enough to receive a lock. Through pivoting, the lid may be maintained at an expanded closed position. An opening may exist between the lid and the base that is large enough for an electrical cord to extend when the lid is at the expanded closed position. This opening between the lid and the base may comprises a cord port.

In another aspect, an electrical device cover may comprise a base configured to mount to an electrical box, the base comprising an opening in a back side large enough to receive an electrical device, the base further comprising a first base end. The lid may comprise a first lid end and a second lid end, the first lid end hingedly coupled to the first base end through a hinge, the lid configured to pivot between a collapsed closed position wherein the lid is collapsed against the base, an expanded closed position wherein the lid is immediately adjacent the base but farther from the back side than in the collapsed closed position, and an open position wherein an inside of the base is exposed. The lid may maintain itself in the expanded closed position such that an opening exists between the lid and the base that is large enough for an electrical cord to extend through when the lid is at the expanded closed position.

In another aspect, a method of using an electrical device cover may comprise mounting a base to an electrical box, the base comprising an opening in a back side large enough to receive an electrical device, the base further comprising a first base end; hingedly coupling a first lid end to the first base end through a hinge; hingedly moving the lid in relation to the base from a collapsed closed position to an expanded closed position wherein a second lid end is immediately adjacent the base but farther from the back side than in the collapsed closed position; and self-maintaining the lid in the expanded closed position.

Particular implementations may include one or more of the following. Pivoting the lid through the hinge to the collapsed closed position, selectively adjusting the first lid end toward a second base end, and simultaneously seating a lid pin in a notch on a base wall when the first lid end is selectively adjusted toward the second base end. Locking the lid into the expanded closed position may occur using a locking tab that extends away from the base. The method may further comprise adjusting the locking tab from an expanded closed position to a collapsed closed position. The method may further comprise adjusting the locking tab by rotating the locking tab between the expanded closed position and the collapsed closed position. The method may further comprise adjusting the locking tab by sliding the locking tab along a channel in the base.

The foregoing and other aspects, features, and advantages will be apparent to those artisans of ordinary skill in the art from the DESCRIPTION and DRAWINGS, and from the CLAIMS.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

BRIEF DESCRIPTION OF THE DRAWINGS

The electrical device cover will hereinafter be described in conjunction with the appended drawings, where like designations denote like elements, and:

FIGS. 16-17 depict a side view of the base of one implementation of an electrical device cover having a rotatable locking tab configured to lock the base and lid together at collapsed and expanded closed positions, respectively;

FIGS. 22-23 depict a side view of the electrical device cover of FIGS. 20-21 having a lid positioned at lockable collapsed and expanded closed positions, respectively;

DESCRIPTION

This disclosure, its aspects and implementations, are not limited to the specific components or assembly procedures disclosed herein. Many additional components and assembly procedures known in the art consistent with the intended operation and assembly procedures for an electrical device cover will become apparent for use with implementations of an electrical device cover from this disclosure. Accordingly, for example, although particular lids, bases, and hinge components are disclosed, such lids, bases, and hinge components and other implementing components may comprise any shape, size, style, type, model, version, measurement, concentration, material, quantity, and/or the like as is known in the art for such implementing components, consistent with the intended operation of an electrical device cover.

Figure 1:
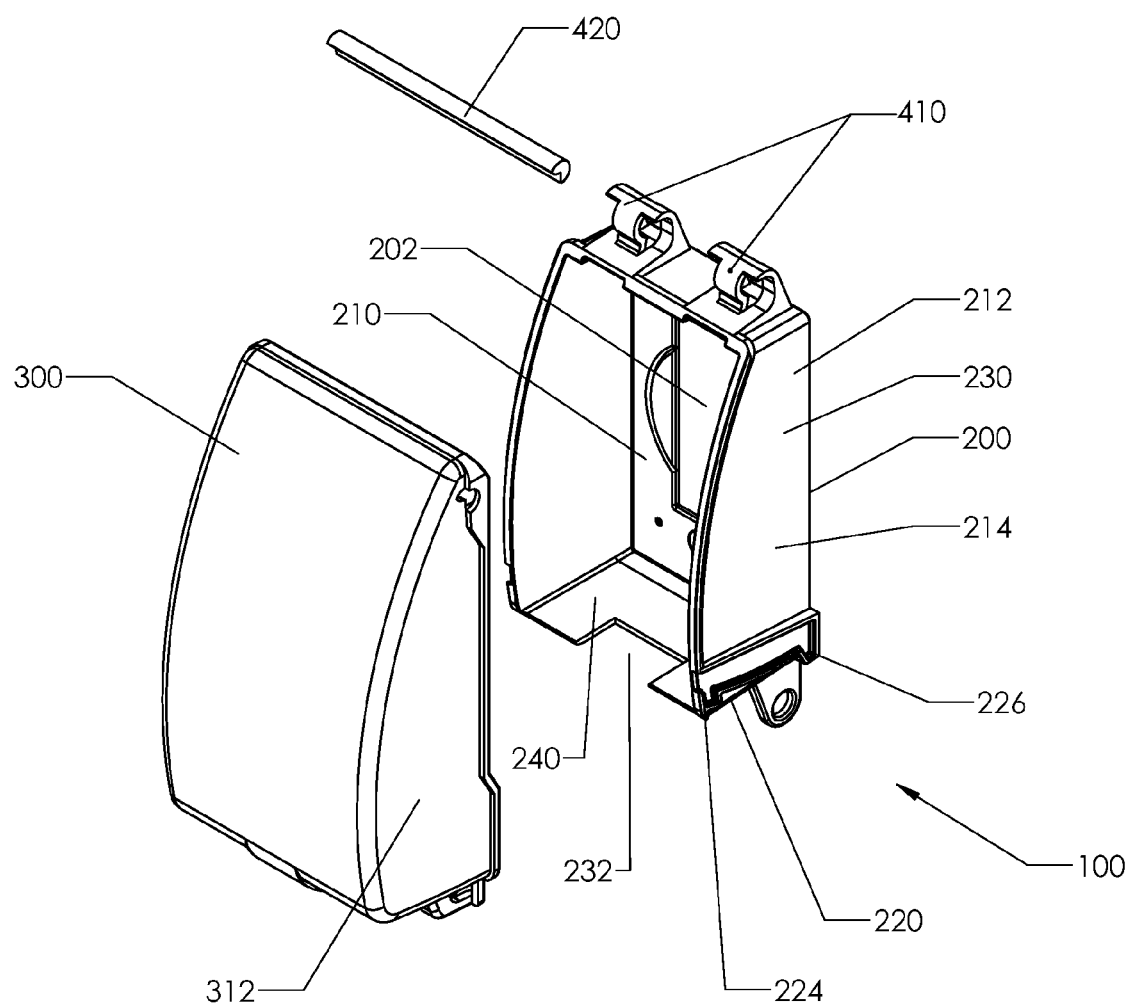
FIG. 1 is a break apart view of one implementation of an electrical device cover.

There are a variety of implementations of the electrical device cover assembly possible from the present disclosure. FIGS. 1-10 and 12-26 illustrate some non-limiting examples of implementations of an electrical device cover assembly, but those of ordinary skill in the art will readily comprehend other particular implementations and variations from the disclosure provided in relation to this particular implementation. Referring now to FIG. 1, in one particular implementation, an electrical device cover 100 comprises a base 200 configured to mount to an electrical box. The base 200 comprises an opening 202 in a back wall 210 large enough to receive an electrical device.

The electrical device may include, but is not limited to, an electrical outlet, a duplex electrical outlet, a decora electrical outlet, a ground fault circuit interrupt (GFCI) electrical outlet, a round electrical outlet, a switch, and so forth. In alternative implementations not shown in the figures, the base 200 may be configured to have one or more removable tab members or adapters allowing for the conversion from no opening 202 to an opening 202 sized for example to receive one of the electrical devices mentioned above or other electrical devices. The base 200 could also be configured to have one or more removable tab members or adapters allowing for the conversion from one sized opening 202 to another sized opening 202 such as to be capable of receiving various sizes of electrical devices. Examples of structures that may be used to enable a base member to be configured for conversion between various other configurations are shown and described in U.S. Pat. Nos. 6,723,922 to Shotey et al. (issued Apr. 20, 2004) titled "Universal cover plate", 6,987,225 to Shotey et al. (issued Jan. 17, 2006) titled "Convertible electrical device cover and method for installing same", 6,441,307 to Shotey et al. (issued Aug. 27, 2002) titled "Universal Cover Plate," and 6,770,816 to Shotey et al. (issued Aug. 3, 2004) titled "Convertible electrical device cover and method for installing same", the relevant disclosures of which are hereby incorporated herein by reference. As suggested in U.S. Pat. No. 6,770,816, the base member may be configured with an opening and attachment members and replaceable adapter plates may be used to enable the installer to select the desired base configuration. These references also include examples of removable cord escape tabs for vertical or horizontal orientations, which also may be included in the present electrical device cover, although not depicted in the drawings.

Figure 13:
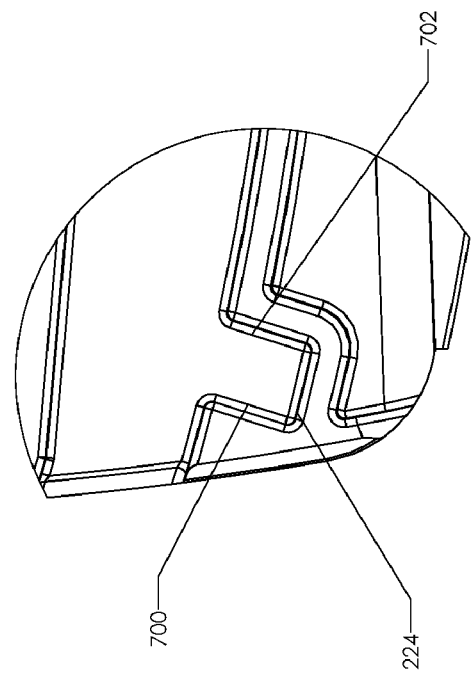
FIG. 13 is an enlarged view of the notch shown in circle A of FIG. 12.
Figure 12:
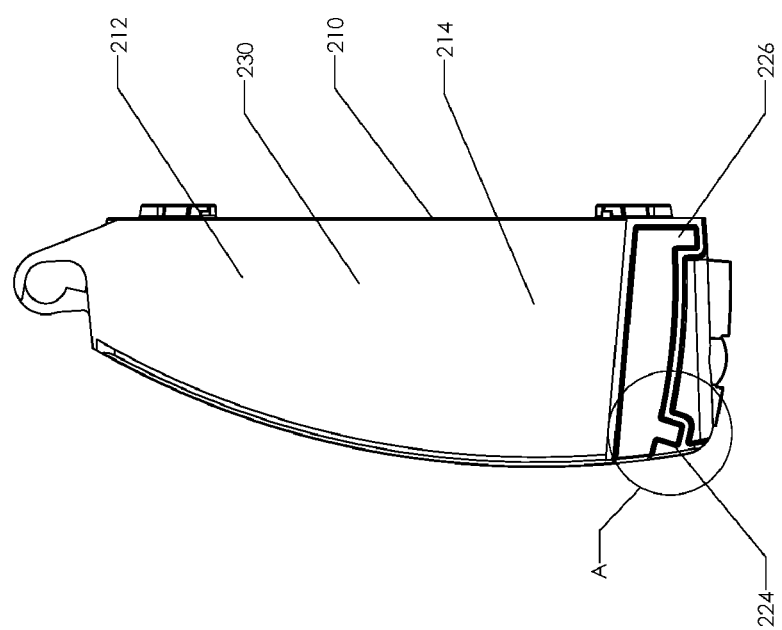
FIG. 12 is a side view of the base of one implementation of an electrical device cover having an angled notch wall.
Figure 15:
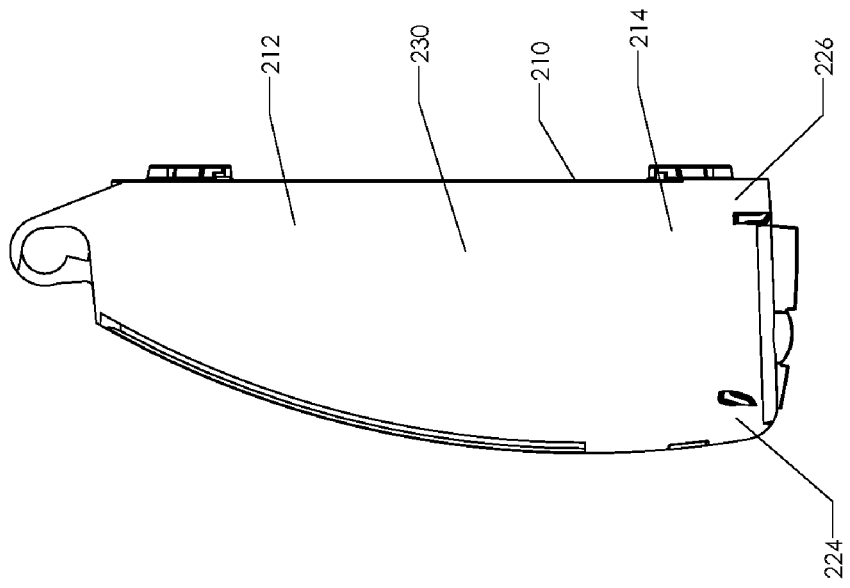
FIG. 15 is a side view of the base of one implementation of an electrical device cover having notches with open ends without a track.
Figure 14:
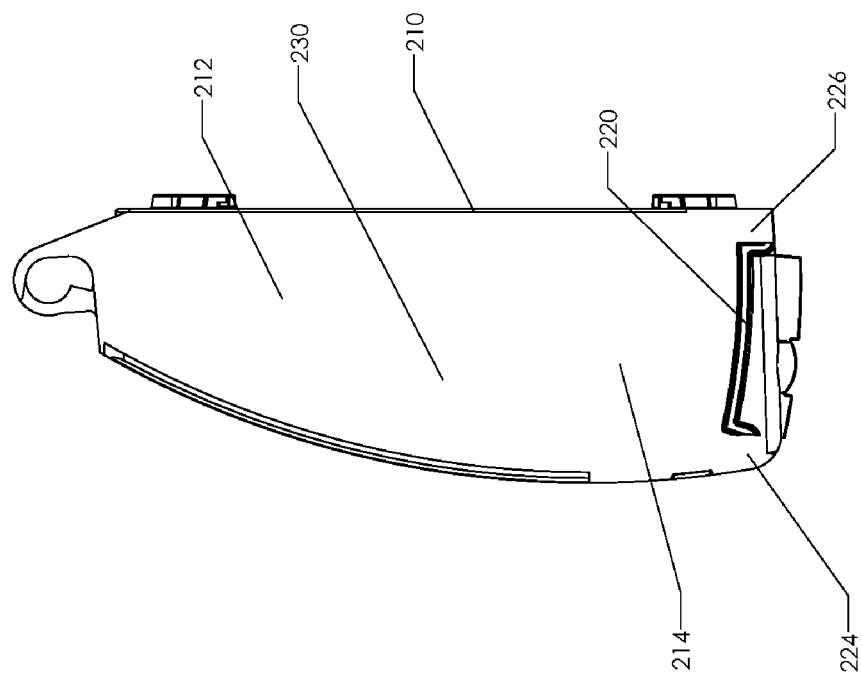
FIG. 14 is a side view of the base of one implementation of an electrical device cover having notches with open ends and a track.

The base 200 further comprises a first base end 212 and a second base end 214 and a track 220 on a base wall 230 at or near the second base end 214. The track 220 comprises two notches in a side of the track 220, the notches extending away from the first base end 212. The notches comprise a first notch 224 near a front opening 240 of the base 200 and a second notch 226 near the back wall 210 of the base 200. The back wall 210 of the base may be permanently attached to the base 200 or may comprise a removable back wall side 210 coupled to the base 200. In the embodiments depicted in FIGS. 1-10, the track 220 is proximate the second base end 214. In alternative embodiments the track may be located proximate the first base end 212 or somewhere in between. In various embodiments the track 220 comprises two tracks 220—one track 220 on each of two opposite base walls 230. In alternative embodiments, notches 224 and 226 may exist without a track 220 being present, as depicted in FIG. 15. While not specifically depicted in the drawings, some embodiments may comprise only one notch 224 near a front opening 240 of the base 200 that allows a lid 300 to be selectively adjusted to an expanded closed position. As depicted in FIGS. 12-13, at least one of the notch walls may comprise an angled notch wall 700 or 702 that tapers in toward the opening of the notch 224 closest the first base end 212. This may provide the advantage of requiring more force to remove a lid pin 320 from the notch 224 after the lid pin 320 has been seated in the notch 224. This is particularly useful in situations where an electrical cord cap is plugged into an electrical device within the cover and the cord extends from the cover. Requiring more force to remove the lid pin 320 from the notch 224 means that it also requires more pull force on the cord to open the cover. FIGS. 14-15 depict alternative embodiments wherein the notches 224, 226 have an open end located at the end of the notch farthest from the first base end 212. As shown in FIG. 14, notch 226 may comprise one wall located on the base 200 and the other notch wall may be formed by a surface of the wall to which the electrical device cover is mounted so that the lid pin sits between the notch 226 wall and the back side 210 of the base.

Figure 2:
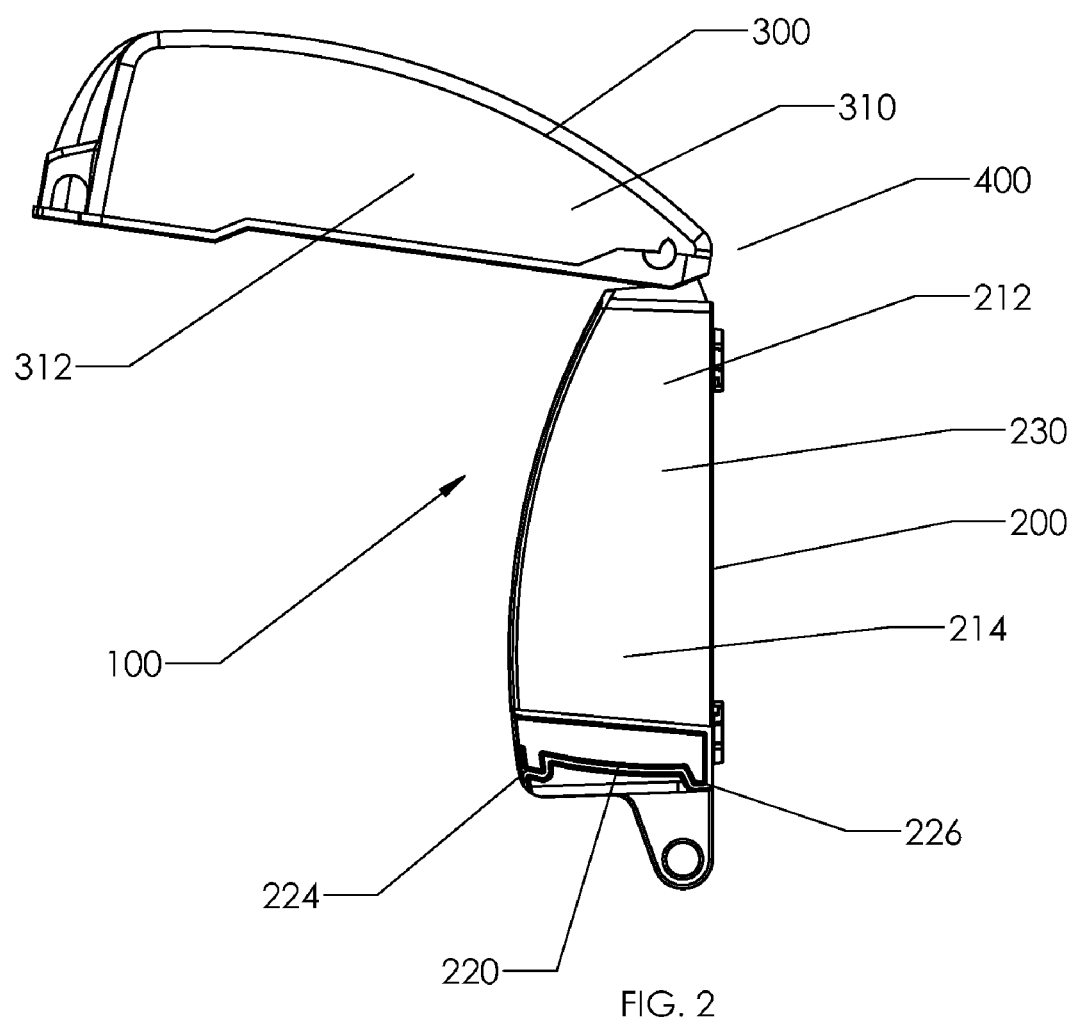
FIG. 2 is a side view of the electrical device cover of FIG. 1 assembled and in an open position.

The electrical device cover 100 further comprises a lid 300 comprising a first lid end 310 and a second lid end 312, the first lid end 310 hingedly coupled to the first base end 212 through a hinge 400 (FIG. 2) configured such that the first lid end 310 in a closed position (such as in FIGS. 3-9) is selectively adjustable generally parallel to the back wall 210 of the base 200 toward and away from the second base end 214. FIG. 2 is an assembled view of the electrical device cover 100 with the lid 300 in an open position. FIGS. 3-9 illustrate the electrical device cover 100 with the lid 300 in a closed position. When the lid 300 is in a first closed position, depicted in FIG. 4, the first lid end 310 is selectively adjustable in a direction not quite exactly parallel, but generally parallel, to the back wall 210 of the base 200, toward and away from the second base end 214. When the lid 300 is in a second closed position, depicted in FIG. 5, the first lid end 310 is selectively adjustable in a direction generally parallel to the back wall 210 of the base 200, toward and away from the second base end 214. Accordingly, although the first lid end 310 in the closed position of FIG. 4 is selectively adjustable in a direction generally parallel to the back wall 210 of the base 200.

The lid 300 further comprises a lid pin 320 (FIG. 9) extending toward the track 220 on the base wall 230 when the lid 300 is in at least one closed position in relation to the base 200. The lid pin 320 in this embodiment extends out from an inner sidewall of the lid 300. In other embodiments the lid pin 320 could extend out from an edge of the lid 300, or from an outer sidewall of the lid 300, and so forth. The lid pin 320 depicted in FIG. 9 is proximate the second lid end 312. In alternative embodiments the lid pin 320 could be proximate the first lid end 310 or somewhere in between. The lid 300 of this particular embodiment is pivotable through the hinge 400 with respect to the base 200 between an open position (FIG. 2) and two closed positions (FIGS. 3-4 and 9; and FIGS. 5-8). In each of the closed positions the lid pin 320 (FIG. 9) seats in the at least one notch of the track 220 on the base 200 when the first lid end 310 is selectively adjusted toward the second base end 214. In various other embodiments, the lid 300 may be pivotable with respect to the base 200 between an open position and only one closed position, or more than two closed positions, and so forth.

Figure 3:
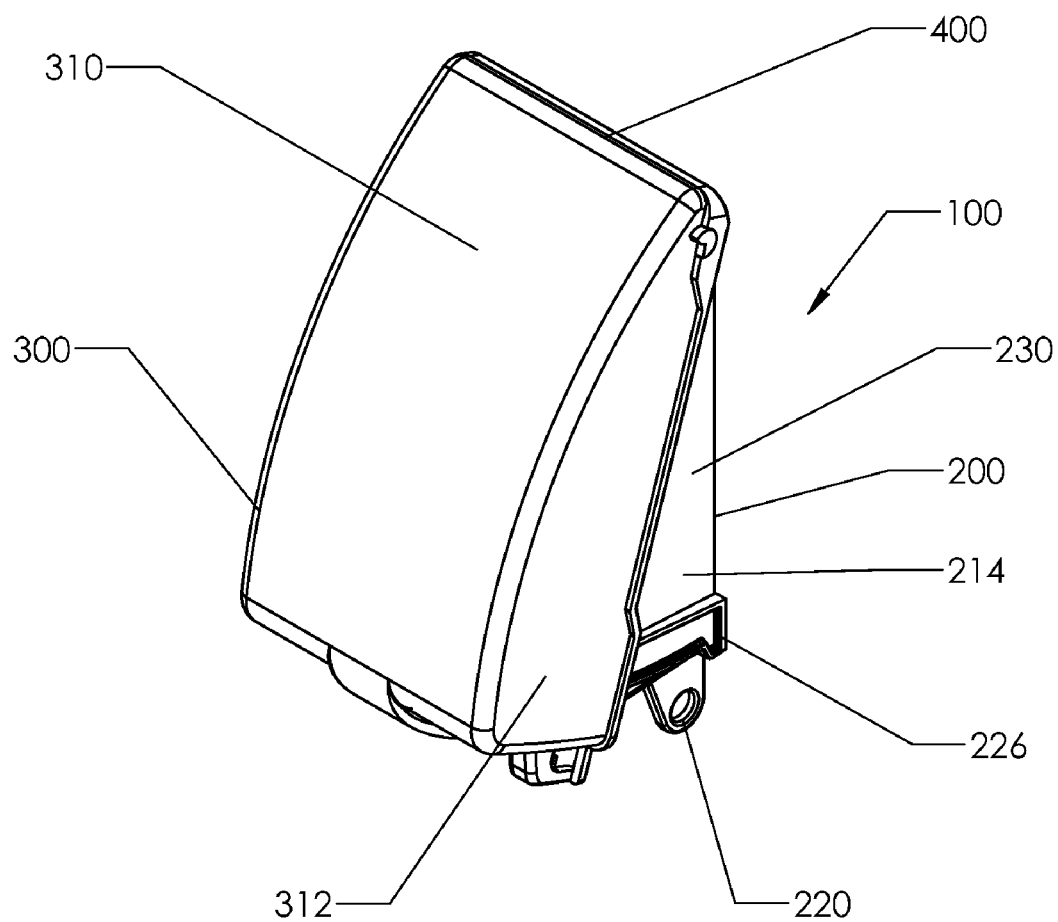
FIG. 3 is a perspective view of the electrical device cover of FIG. 2 in a first closed position.
Figure 4:
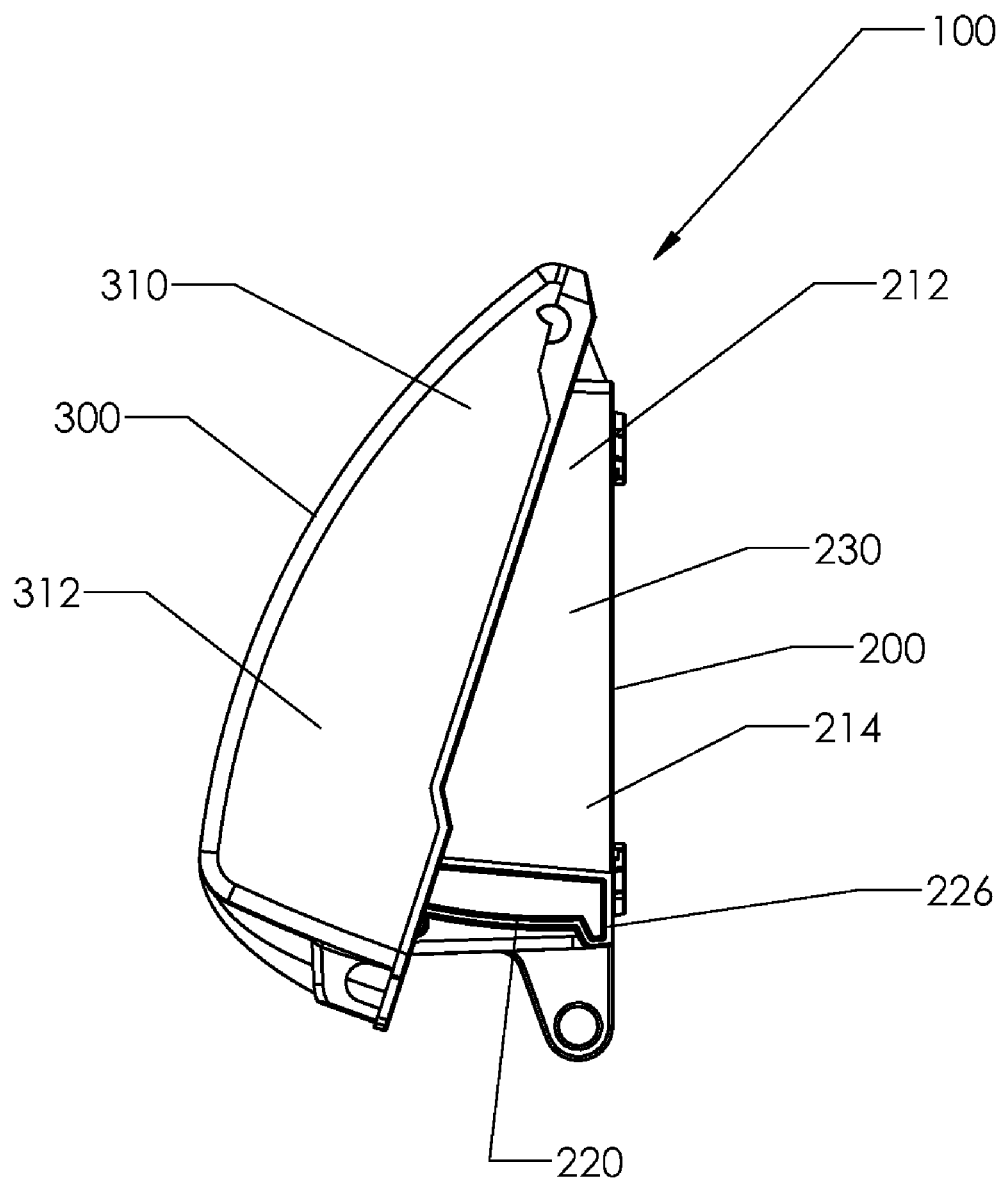
FIG. 4 is a side view of the electrical device cover of FIG. 2 in a first closed position.
Figure 5:
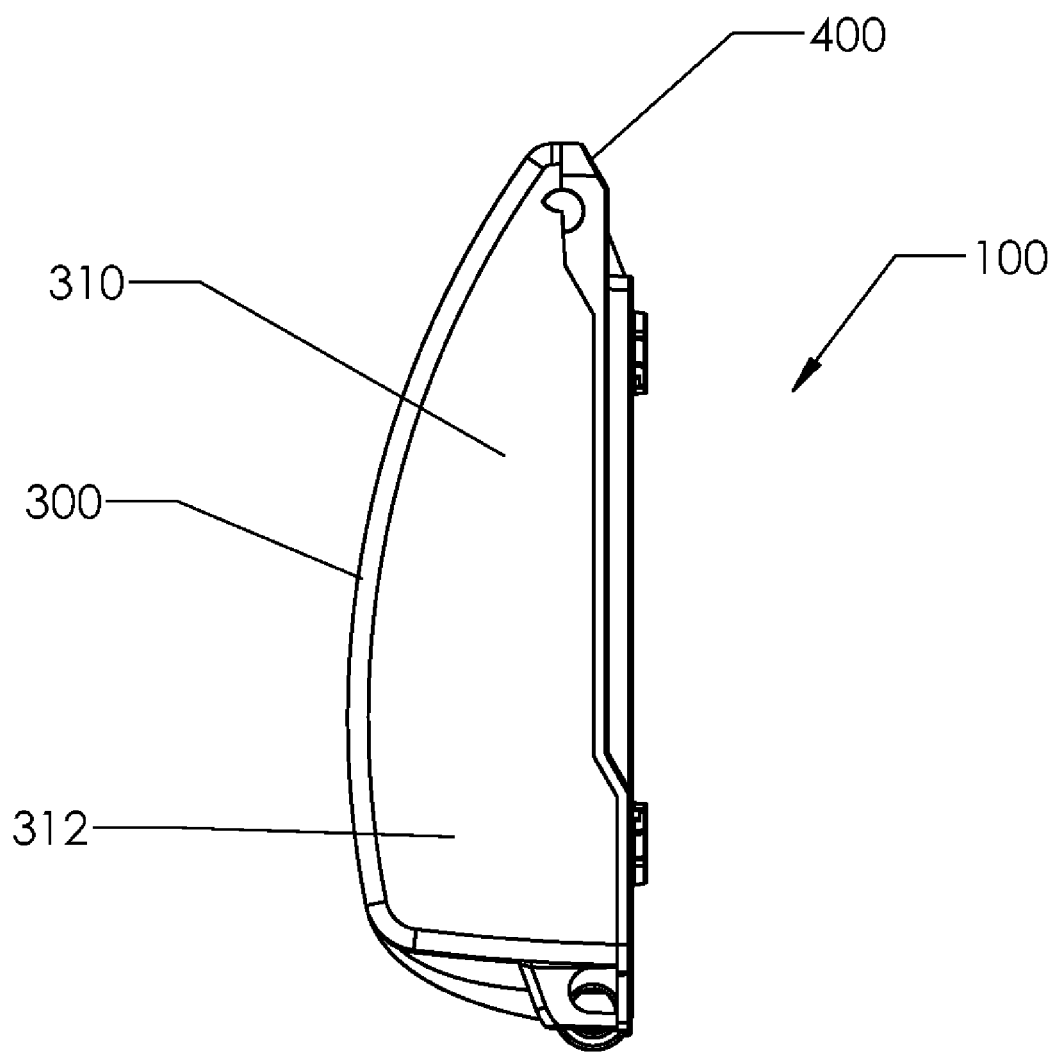
FIG. 5 is a side view of the electrical device cover of FIG. 2 in a second closed position.
Figure 6:
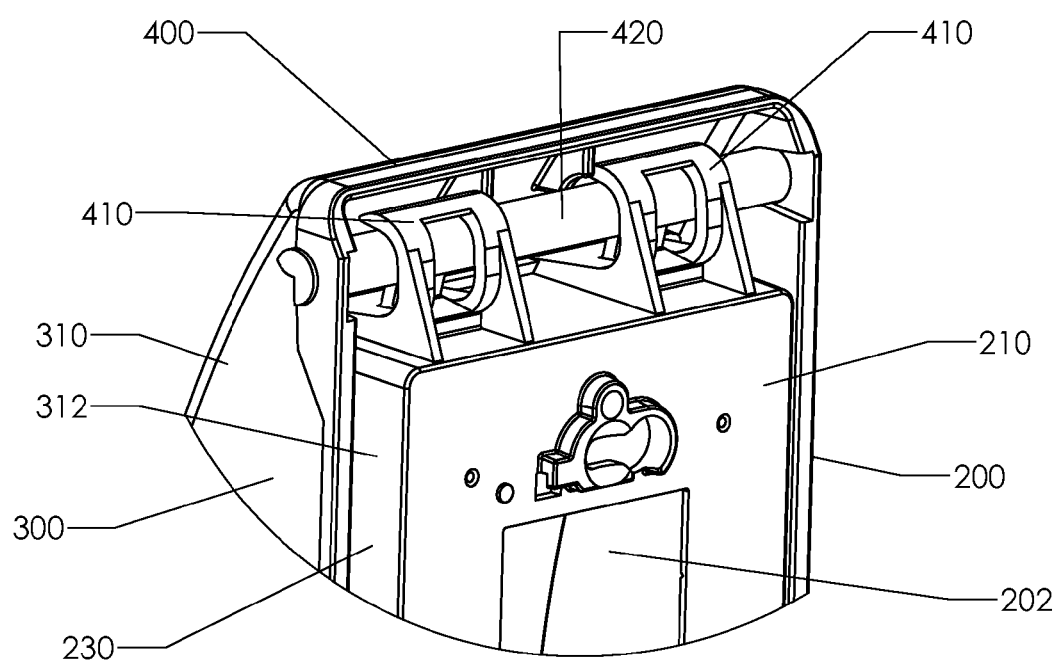
FIG. 6 is a perspective rear side view of an upper portion of the electrical device cover of claim 2 in a closed position with the first lid end selectively adjusted away from the second base end of the electrical device cover.
Figure 7:
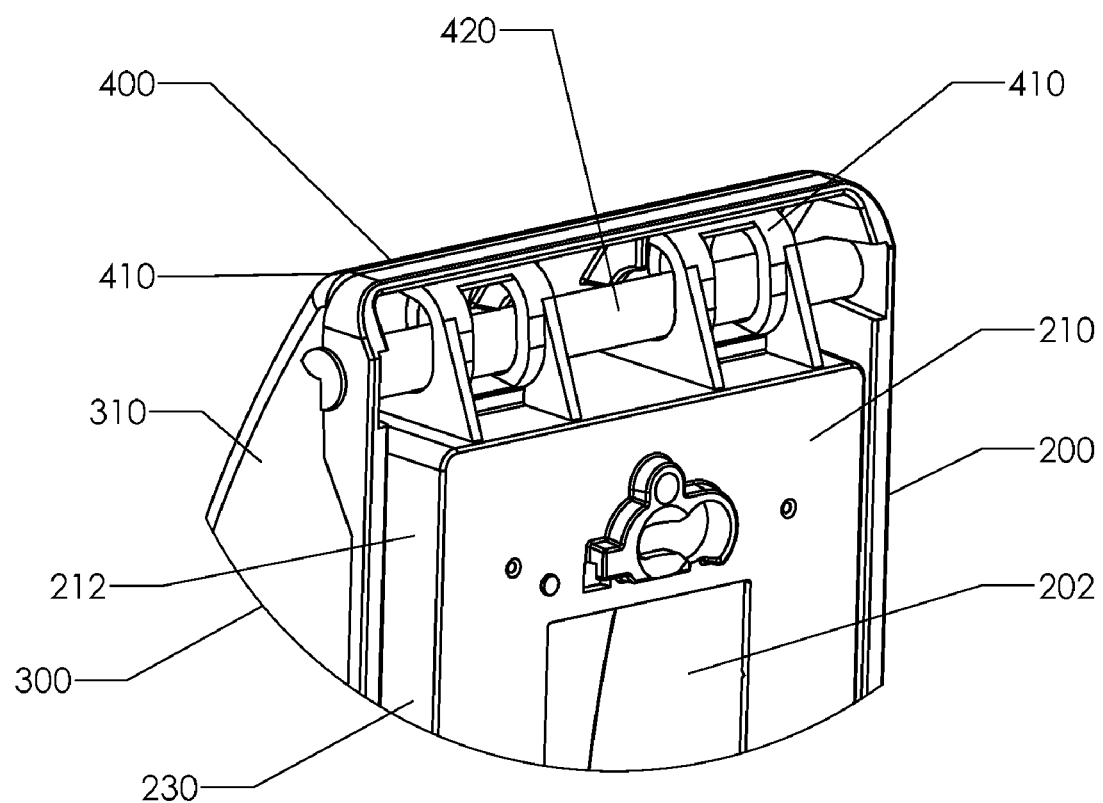
FIG. 7 is the electrical device cover of FIG. 6 with the first lid end selectively adjusted toward the second base end of the electrical device cover.

In the first closed position, pictured in FIGS. 3-4, the lid pin 320 (FIG. 9) is seated in the first notch 224. In a second closed position, pictured in FIG. 5, the lid pin 320 (FIG. 9) is seated in the second notch 226. When the lid pin 320 is seated in one of the notches (224 or 226) the lid 300 is in a latched position, meaning that the lid 300 is not pivotable with respect to the base 200 until a user manually adjusts the first lid end 310 away from the second base end 214 generally parallel to the back wall 210 to remove the lid pin 320 from the notch in which it is seated. Once the lid pin 320 fully exits the notch from which it is seated, the lid 300 is in an unlatched position and is again pivotable with respect to the base 200.

When the lid 300 is in the first closed position, depicted in FIGS. 3-4, a cord may exit the electrical device cover 100 through a cord escape 232 (FIG. 1) in the base 200. In this way the electrical device cover 100 may function as a while-in-use electrical device cover, allowing a user to plug a cord into an electrical device and then close the lid 300 to the first closed position—thereby protecting the electrical device and cord but still allowing the electrical device to be used. The cord escape 232 or cord port alternatively could be formed as part of the lid 300, or both the lid 300 and the base 200. The cord escape 232 may comprise in certain embodiments a push-out tab or other removable piece that when removed forms the cord escape 232 or cord port.

In the implementation depicted in FIGS. 1-10, the hinge 400 comprises: a hinge pin holder 410 (FIG. 1) on the base 200 at or near the first base end 212; and a hinge pin 420 held by the hinge pin holder 410, and the lid 300 is coupled to the hinge pin 420 and is fixed in position relative to the hinge pin 420. In this particular embodiment, this is accomplished by approximating the shape of the cross section of the hinge pin 420, which is a circle with a depression or notch removed, with a matching hole in the lid 300, also a circle with a protrusion extending from an inner surface of the circle, configured to receive the hinge pin 420, so that when the lid 300 is coupled to the hinge pin 420 through the matching hole the lid 300 and hinge pin 420 are then rotationally fixed in position relative to each other. The lid 300 can then pivot and the hinge pin 420 will correspondingly pivot together with it. The hinge pin holder 410 is a passage through which the hinge pin 420 can pass. In alternative embodiments, the hinge pin holder 410 could comprise a snap-in holder, a tunnel, and so forth. The hinge pin holder 410 is fixed in position relative to the base 200. The hinge pin holder 410 may be shaped to mate with the shape of the hinge pin 420 (FIG. 8), when the first lid end 310 is selectively adjusted toward the second base end 214 in the at least one closed position, to assist in latching the lid 300 in a closed position.

Figure 8:
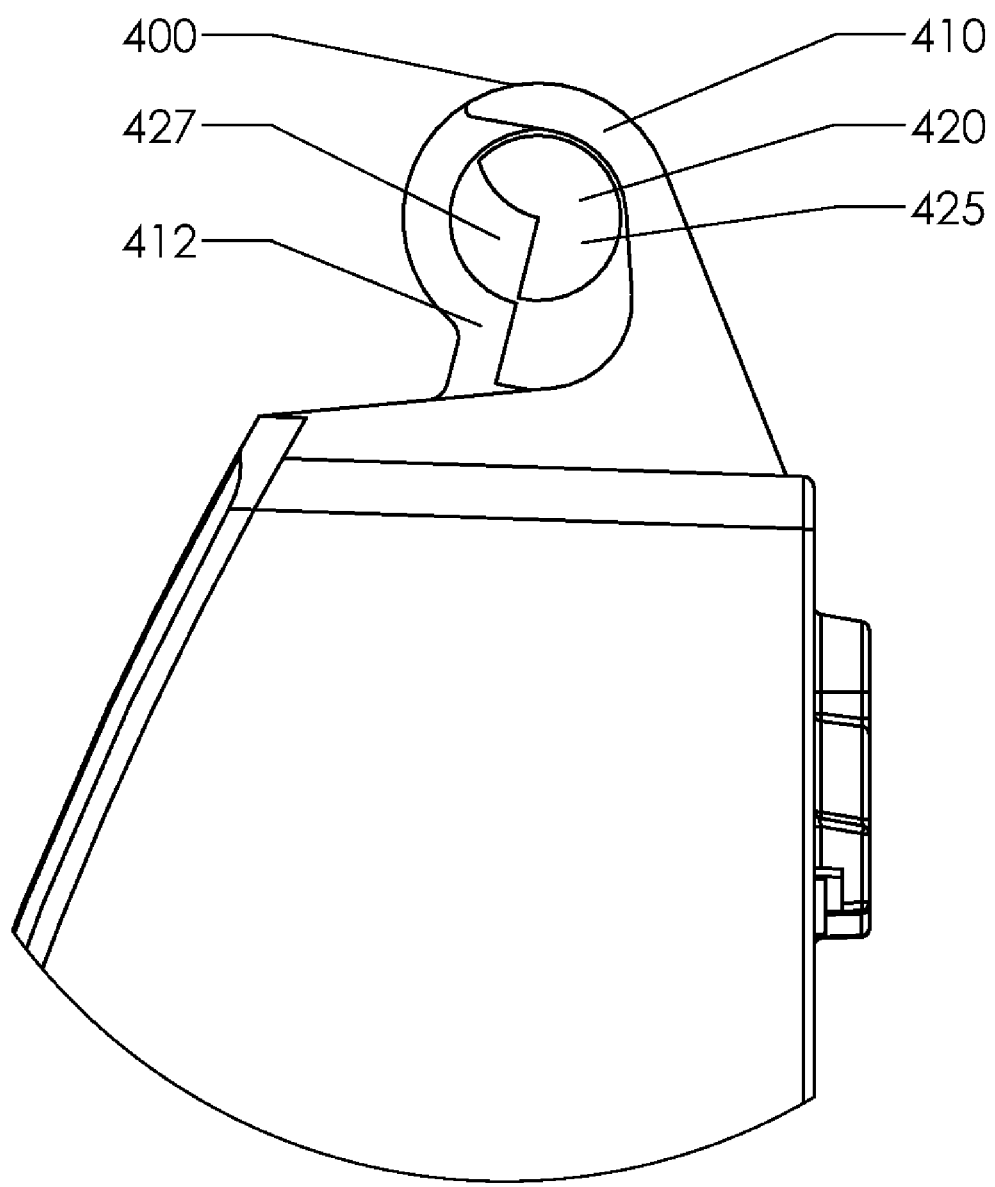
FIG. 8 is a side view of the base and hinge pin of the electrical device cover of FIG. 6.
Figure 9:
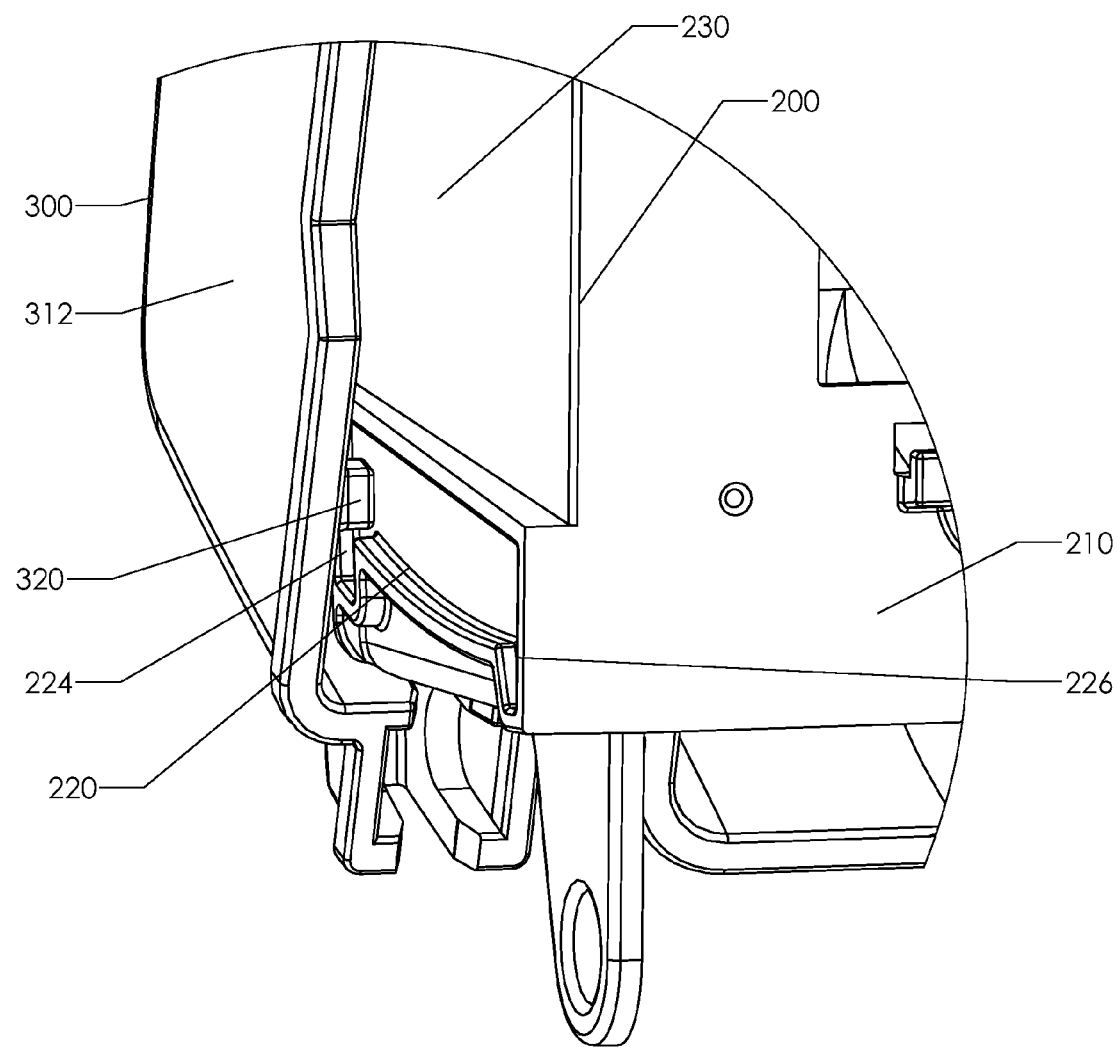
FIG. 9 is a perspective rear side view of a lower portion of the electrical device cover of claim 2 in a closed position.
Figure 10:
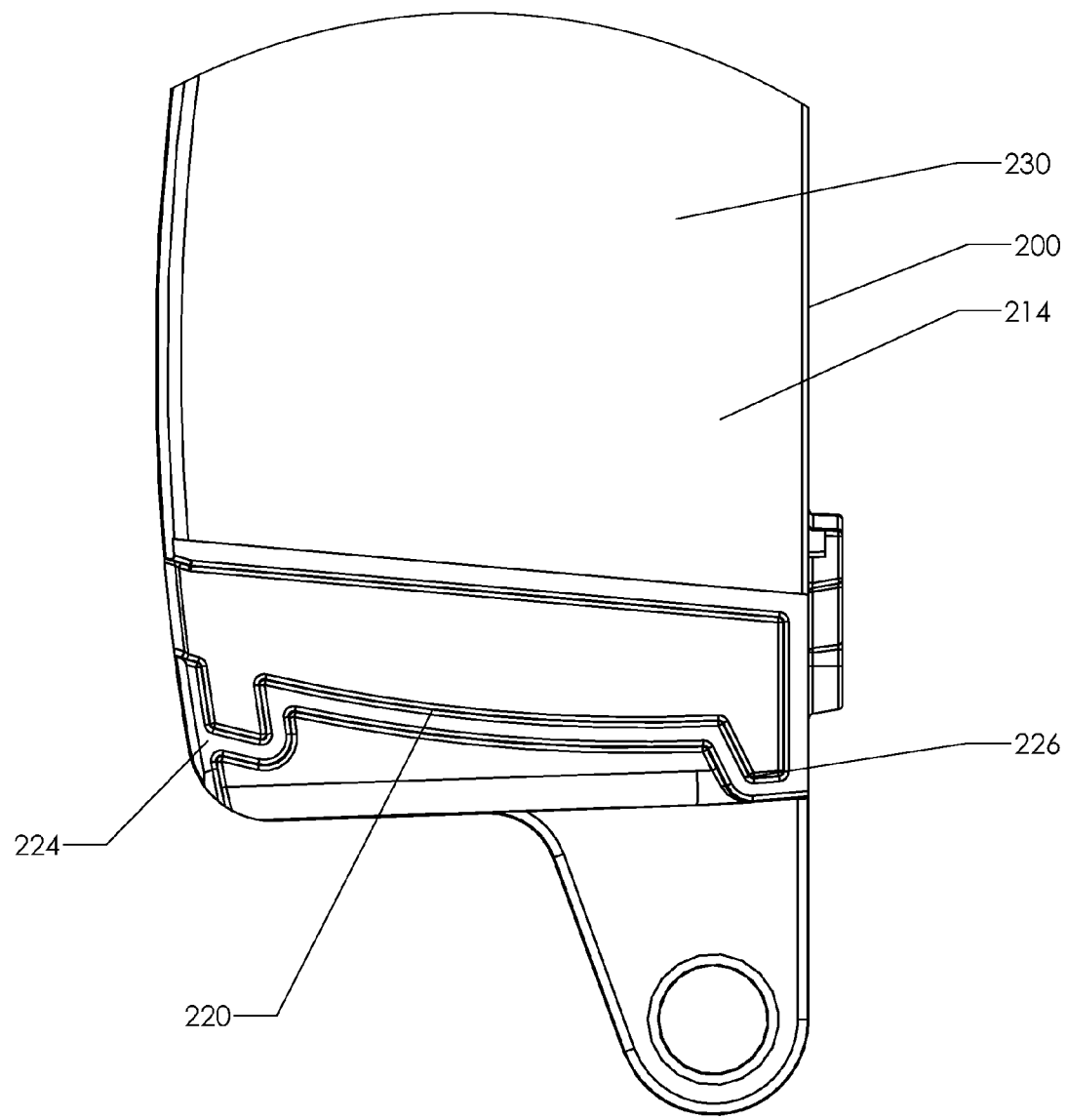
FIG. 10 is a side view of a lower portion of the base of the electrical device cover of FIG. 1.

Referring now to FIG. 8, an end 425 view of the hinge pin 420 comprises the shape of a circle with a depression 427, the depression 427 corresponding to a projection 412 in the hinge pin holder 410 such that when the depression 427 of the circle aligns with the projection 412 the first lid end 310 is adjustable toward the second base end 214. The end view in the illustrated embodiment of FIG. 8 is on the end 425 of the hinge pin 420. The hinge pin 420 need not comprise the shape of the end 425 with the shape of a circle with a depression 427 along the full length of the hinge pin 420—it could be only on one or both ends or in one or more discrete locations along the length of the hinge pin 420. For instance in various embodiments a portion of the hinge pin 420 may comprise one or more cross sections of a circle with a depression 427 while the rest of the hinge pin 420 comprises a cross section of a complete circle with no depression 427.

Figure 11:
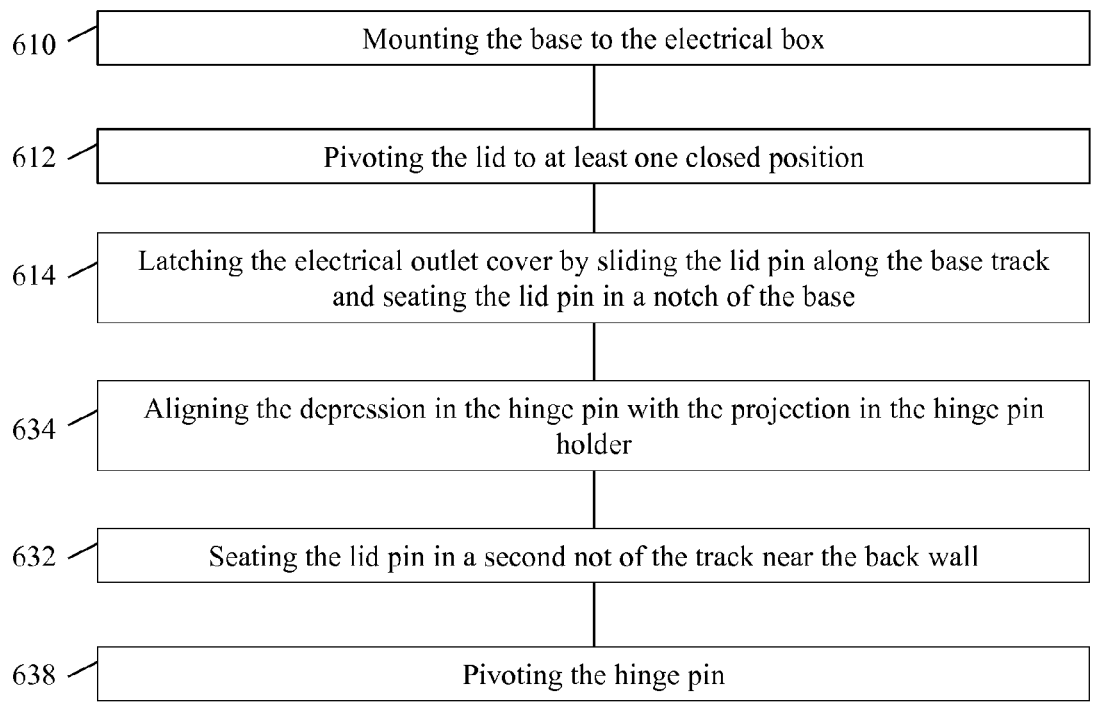
FIG. 11 is an illustration of a method of using an electrical device cover.

FIG. 11 illustrates a non-limiting example of one method of using the electrical device cover 100 described with reference to FIGS. 2-5, but those of ordinary skill in the art will readily comprehend other particular implementations and variations from the disclosure provided in relation to this particular method. Referring now to FIG. 11, a method of using an electrical device comprises mounting the base 200 to the electrical box (step 610). The base 200 is generally mounted to an electrical box like other conventional while-in-use cover using box mounting screws that extend through box mounting screw apertures in the base (see FIG. 6). The lid 300 is coupled to the base through a lid pin 320 as described elsewhere in this application. The method further comprises pivoting the lid to from an open position to a first closed position (step 612) and latching (step 614) the electrical outlet cover by sliding the lid pin along the base track and seating it in a notch of the base track. When the lid pin seats in the notch of the base, the lid moves downward in the direction of the bottom end of the base and the depression in the hinge pin couples with the projection in the hinge pin holder. The step of pivoting the lid to a closed position (step 612) may further comprise pivoting the lid to a second closed position where the lid is collapsed from its first closed position. This also involves sliding the lid pin along the base track (farther than with the previous opening to the track) and seating the lid pin in a second notch of the base track. The lid is again latched in this position by the hinge pin coupling with the projection in the hinge pin holder. The method may further comprise aligning the depression 427 in the hinge pin 420 with the projection 412 in the hinge pin holder 410 (step 634). The method may further comprise pivoting the hinge pin 420 (step 638).

In one method of using the electrical device cover 100 the step 610 comprises mounting a base 200 of the electrical device cover 100 to an electrical box and receiving an electrical device through an opening 202 in a back wall 210 of the base 200, step 612 comprises pivoting a lid 300, through a hinge 400 coupled to the base 200, at or near a first base end 212 and coupled to the lid 300 at or near a first lid end 310, to an open position and pivoting the lid 300 to at least one closed position and engaging a lid pin 320 on the lid 300 with a track 220 on a base wall 230 at or near a second base end 214, and step 614 comprises latching the electrical device cover 100 by selectively adjusting the first lid end 310 generally parallel to the back wall 210 of the base 200 toward the second base end 214 and seating the lid pin 320 in a notch on the track 220.

In this method the step 612 of pivoting the lid 300 to at least one closed position and engaging the lid pin 320 may further comprise automatically pivoting the lid 300 to at least one closed position by gravity upon manual release of the lid 300 from an open position, and automatically adjusting the first lid end 310 generally parallel to the back wall 210 of the base 200 toward a second base end 214 opposite the first base end 212 by gravity. The step of seating the lid pin in a notch of the base may comprise seating the lid pin 320 in a first notch 224 of the track 220 near a front opening 240 of the base by gravity. In other words a user holding the lid 300 in an open position may let go of the lid 300, and upon letting go of the lid 300 it may pivot towards the first closed position. Upon the lid 300 pivoting to the point where the lid pin 320 is aligned with the first notch 224, the first lid end 310 adjusts by gravity, generally parallel to the back wall 210 of the base, towards the second base end 214, and the lid pin 320 resultantly seats in the first notch 224.

This method may further comprise the step of sliding the lid pin 320 along the track 220 towards the back wall 210, and seating the lid pin 320 in a second notch 226 of the track 220 near the back wall 210 (step 632). The method may also further comprise aligning a depression 427 in a hinge pin 420 of the hinge 400 with a corresponding projection 412 in a hinge pin holder 410 of the hinge 400, such that when the depression 427 aligns with the projection 412, the second lid end 312 is positioned for the lid pin 320 to be seated in the notch. The method may further comprise pivoting the hinge pin 420 with the position of the hinge pin 420 fixed relative to the lid 300.

The method may further comprise allowing a cord to escape through the electrical device cover 100 through a cord escape 232 when the lid 300 is in the first closed position.

Figure 19:
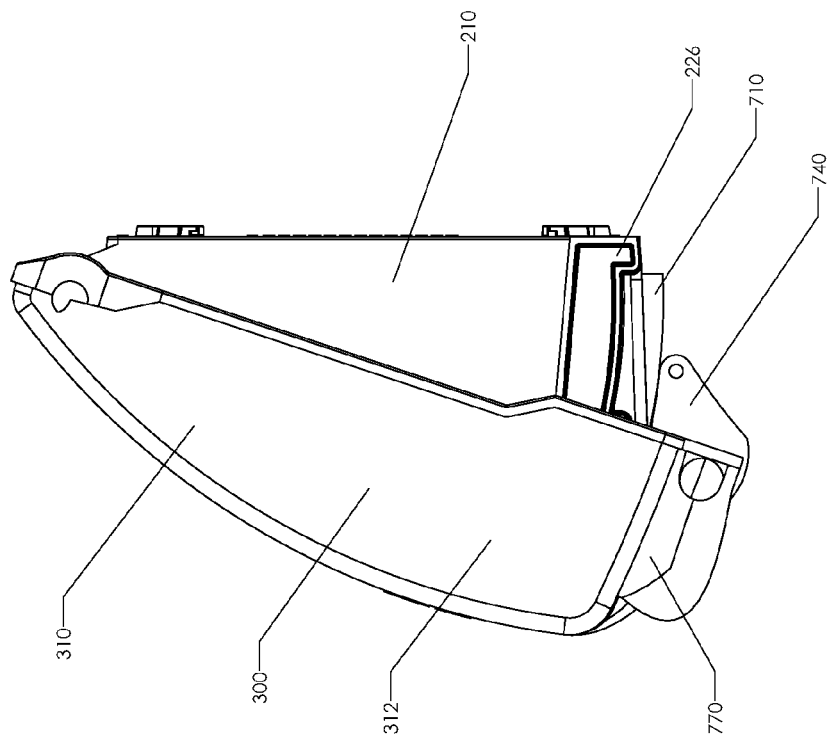
FIGS. 18-19 depict a side view of the electrical device cover of FIGS. 16-17 having a lid positioned at collapsed and expanded closed positions, respectively.
Figure 18:
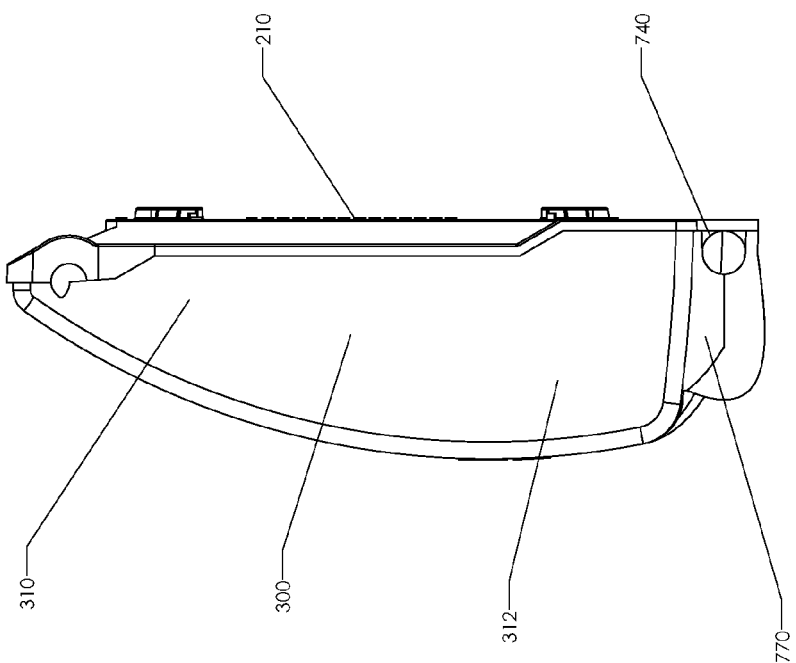
Figure 21:
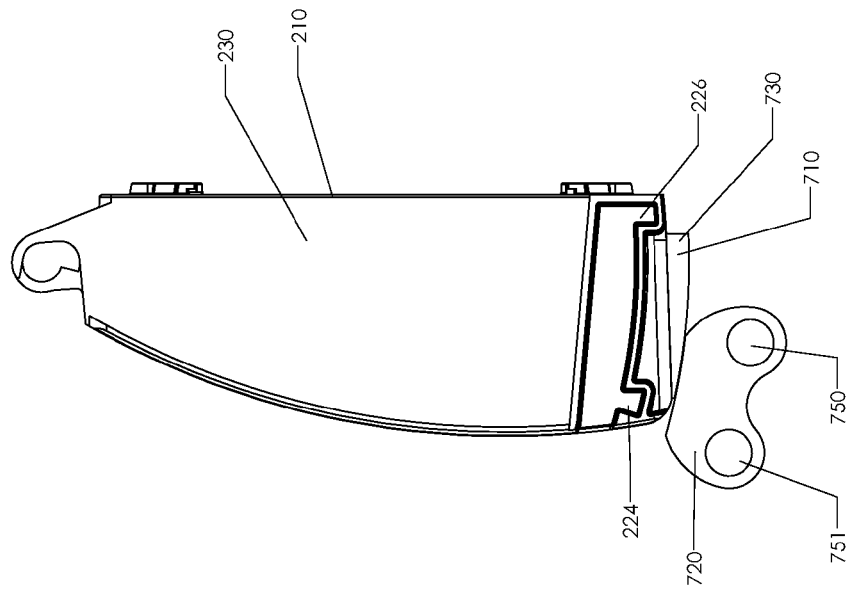
FIGS. 20-21 depict a side view of the base of one implementation of an electrical device cover having a slidably adjustable locking tab configured to lock the base and lid together at collapsed and expanded closed positions, respectively.
Figure 20:
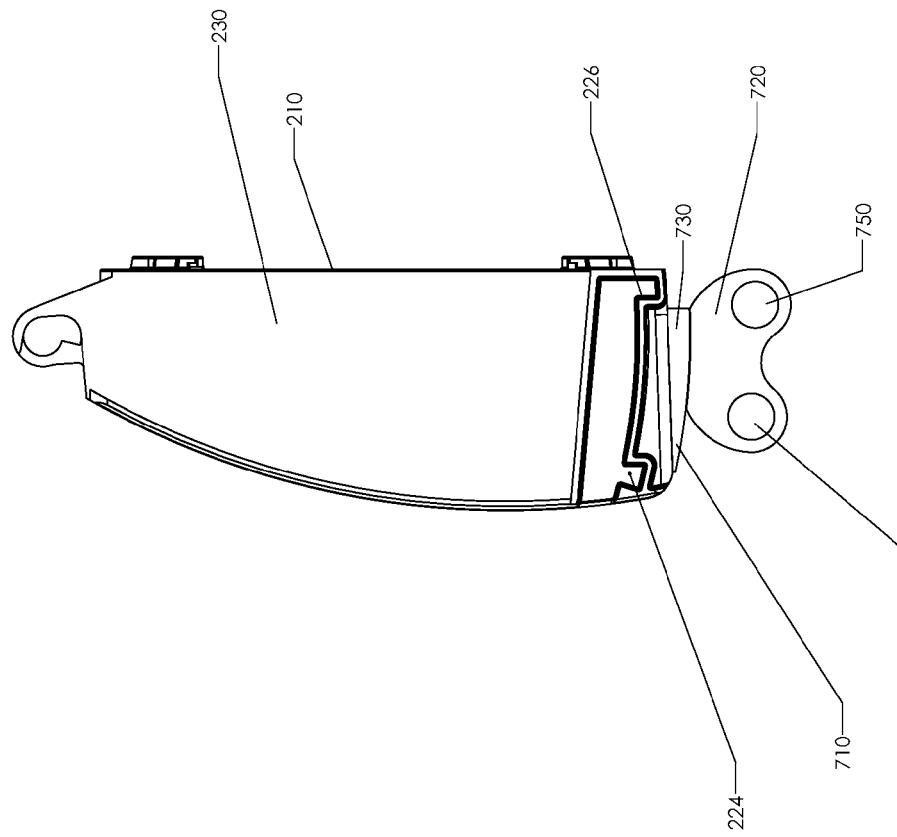

FIGS. 16-23 depict alternative embodiments of an electrical device cover further comprising an optional adjustable locking tab 720, 740 that is adjustably coupled to the bottom wall 710 of the base 200 such that the adjustable locking tab 720, 740 is configured to provide a locking position to lock the lid 300 and the base 200 together at an expanded closed position and a collapsed closed position relative to the base 200. Insertion of a pad lock or other locking pin through the aligned openings of the lid 300 and base 200 is one way to lock in each of the locking positions. FIGS. 16-19 depict an embodiment having a rotatable locking tab 740 that rotates to a second expanded position (FIG. 17) relative to its initial position (FIG. 16) allowing the lid 300 to be locked in a collapsed closed position relative to the base 200 (FIG. 18) or an expanded closed position relative to the base 200 (FIG. 19). The locking tab 740 may be coupled to the base through a screw, spring-biased fitting or other method known in the art for allowing rotatably coupled components to be coupled to a base.

FIGS. 20-23 depict an embodiment having a slidable locking tab 720 that slides along a channel 730 on the bottom wall 710 of the base 200 allowing the lid 300 to be locked in a collapsed closed position relative to the base 200 (FIG. 22) or an expanded closed position relative to the base 200 (FIG. 23). FIGS. 18-19 and 22-23 further depict a lid extension 770 having an opening that aligns with an opening 750 of the adjustable locking tab 720, 740 that is large enough to allow a lock to pass through the openings 750. The slidable locking tab 720 may also have two openings 750, 751 such that the first opening 750 is received by the lid extension 770 when the lid 300 is in a collapsed closed position and the second opening 751 is received by the lid extension 770 when the lid 300 is in an expanded closed position.

Figure 24:
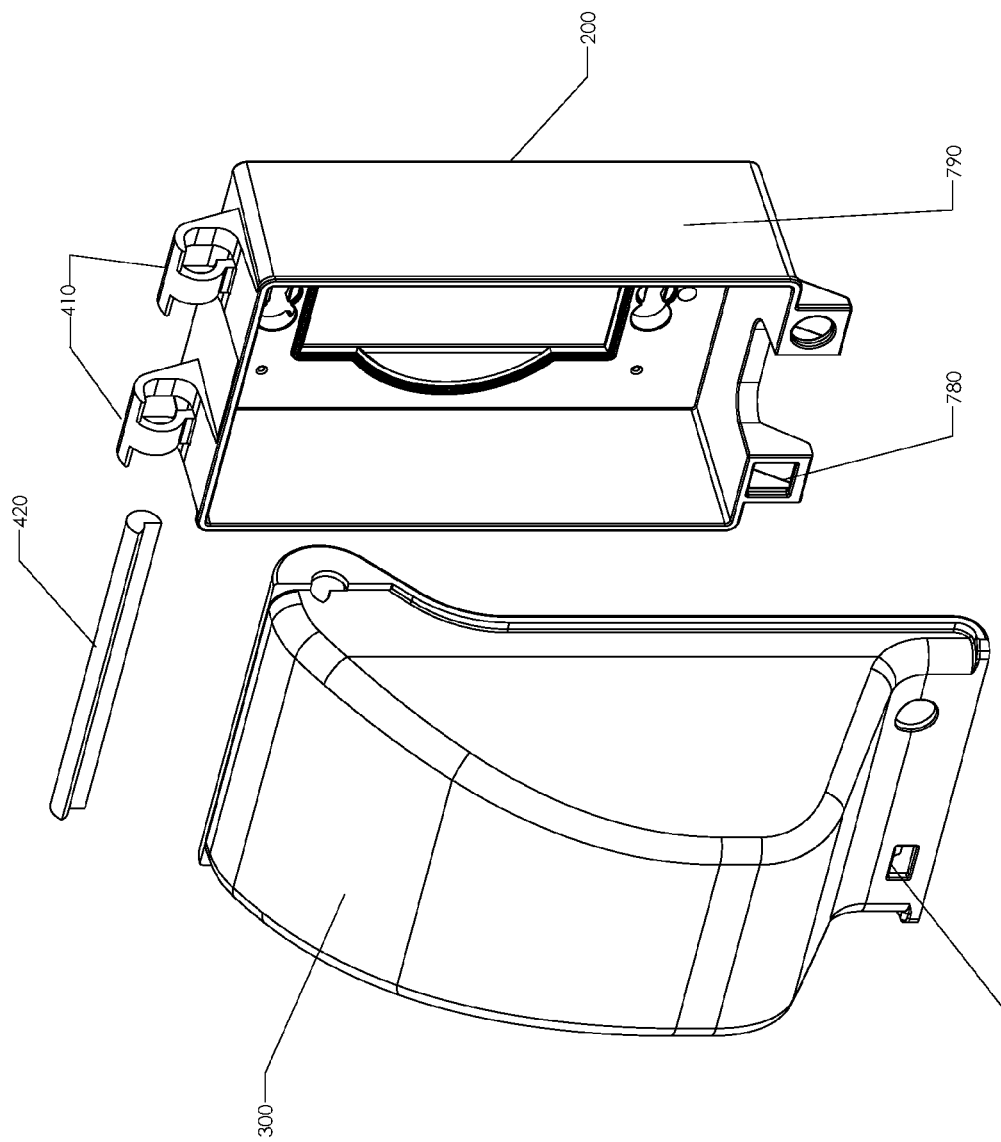
FIG. 24 is a break apart view of one implementation of an electrical device configured to support a latch.
Figure 25:
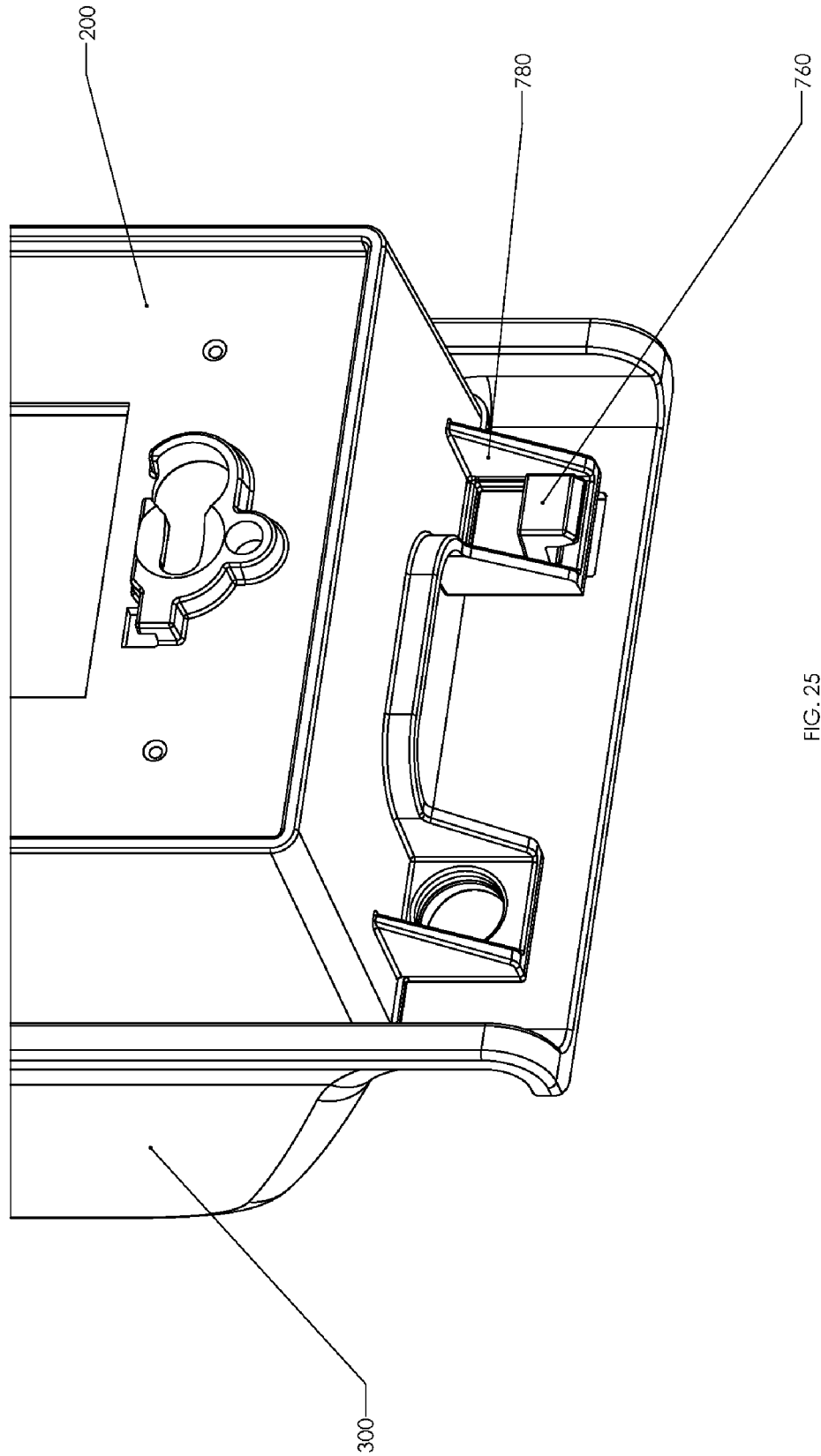
FIGS. 25-26 depict the implementation of FIG. 24 having a latch in engaged and non-engaged positions, respectively.
Figure 26:
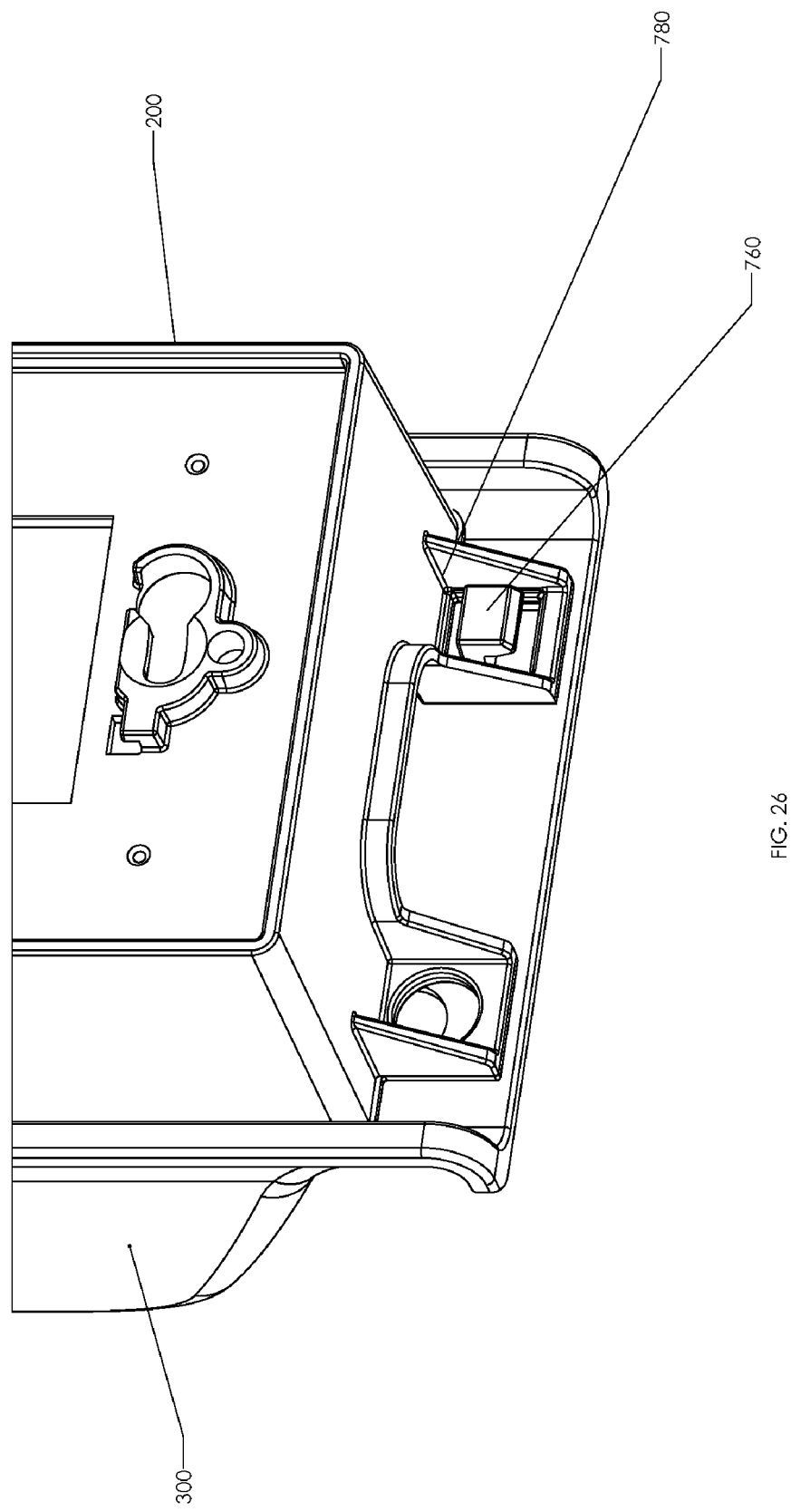

FIGS. 24-26 depict an alternative embodiment of an electrical device cover that utilizes a lid pin 760 that seats in a notch 780 on the base 200 and secures the base 200 and lid 300 together. FIG. 25 shows the lid pin 760 in a seated position in the notch 780 such that the lid 300 and base 200 are secured together. FIG. 26 shows the lid pin 760 in an unseated position in the notch 780 such that the lid 300 and base 200 are unsecured. Like the hinge pin discussed with respect to FIG. 8, this as the hinge pin 420 moves closer to and farther away from the second base end 790, the lid pin 760 is seated on (so the lid cannot be opened), and unseated from the notch 780.

It will be understood that implementations are not limited to the specific components disclosed herein, as virtually any components consistent with the intended operation of a method and/or system implementation for an electrical device cover may be utilized. Accordingly, for example, although particular lids, hinges, and bases may be disclosed, such components may comprise any shape, size, style, type, model, version, class, grade, measurement, concentration, material, weight, quantity, and/or the like consistent with the intended operation of a method and/or system implementation for an electrical device cover.

The concepts disclosed herein are not limited to the specific implementations shown herein. For example, it is specifically contemplated that the components included in a particular implementation of an electrical device cover may be formed of any of many different types of materials or combinations that can readily be formed into shaped objects and that are consistent with the intended operation of an electrical device cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical device covers, lids, bases, removable tabs, adapters, hinges, cord ports, and electrical devices, and any other components forming a particular implementation of an electrical device cover may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover, comprising:
a base configured to mount to an electrical box, the base comprising an opening in a back side large enough to receive an electrical device, the base further comprising a first base end and a second base end and a notch on a base wall at or near the second base end and at or near a front opening of the base, the notch extending away from the first base end; and
a lid comprising a lid pin extending toward the notch on the base wall when the lid is in at least one closed position in relation to the base, the lid further comprising a first lid end and a second lid end, the first lid end hingedly coupled to the first base end through a hinge configured such that the first end of the lid is selectively adjustable with respect to the base toward and away from the second base end;
wherein the lid is pivotable through the hinge with respect to the base between an open position and the at least one closed position, and wherein in the at least one closed position the lid pin seats in the notch on the base wall when the first end of the lid is selectively adjusted toward the second base end.

2. The electrical device cover of claim 1 wherein the notch further comprises a first notch wall and a second notch wall extending away from the base wall wherein at least one of the notch walls occupies a plane that is nonparallel to the back side of the base.

3. The electrical device cover of claim 1 further comprising a second notch on the base wall at or near the second base end and the back wall of the base wherein the lid pin seats adjacent to the second notch on the base wall when the first end of the lid is selectively adjusted toward the second base end and the lid is in a collapsed position.

4. The electrical device cover of claim 3 wherein the lid pin seats between the second notch and the back side of the base when the first end of the lid is selectively adjusted toward the second base end and the lid is in a collapsed position.

5. The electrical device cover of claim 1, wherein when the lid pin is seated in the notch on the base wall, the lid is latched such that it is restricted from moving to the open position.

6. The electrical device cover of claim 5 further comprising a locking tab extending away from the base, wherein a position of the locking tab is slidably adjustable along a channel on the base.

7. The electrical device cover of claim 5 further comprising a rotatable locking tab extending away from the base, wherein a position of the rotatable locking tab is adjusted by rotating the locking tab relative to an initial position.

8. The electrical device cover of claim 7 wherein the rotatable lock tab is adjusted by rotating the locking tab 180 degrees relative to the initial position.

9. The electrical cover of claim 1 wherein an end of the notch located farthest from the first base end is open.

10. The electrical cover of claim 1 further comprising a track between the notch and the back side of the base.

11. An electrical device cover, comprising:
a base configured to mount to an electrical box, the base comprising an opening in a back side large enough to receive an electrical device, the base further comprising a first base end;
a lid comprising a first lid end and a second lid end, the first lid end hingedly coupled to the first base end through a hinge; and
an adjustable locking tab adjustably coupled to the base, the adjustable locking tab configured to lock the lid and base together at an expanded closed position relative to the base and at a collapsed closed position relative to the base.

12. The electrical device cover of claim 11 wherein the adjustable locking tab is rotatable relative to an initial position.

13. The electrical device cover of claim 12, wherein the adjustable locking tab is rotatable 180 degrees relative to the initial position.

14. The electrical device cover of claim 11 wherein the adjustable locking tab is slidably adjustable along a channel on a bottom wall of the base.

15. The electrical device cover of claim 14 wherein the adjustable locking tab further comprises two openings therethrough, each opening large enough to receive a lock.

16. The electrical device cover of claim 11 wherein through pivoting, the lid is maintained at the expanded closed position.

17. The electrical device cover of claim 11 further comprising an opening between the lid and the base large enough for an electrical cord to extend through the opening when the lid is at the expanded closed position.

18. The electrical device cover of claim 17 wherein the opening between the lid and the base comprises a cord port.

19. An electrical device cover, comprising:
a base configured to mount to an electrical box, the base comprising an opening in a back side large enough to receive an electrical device, the base further comprising a first base end; and
a lid comprising a first lid end and a second lid end, the first lid end hingedly coupled to the first base end through a hinge, the lid configured to pivot between a collapsed closed position wherein the lid is collapsed against the base, an expanded closed position wherein the lid is immediately adjacent the base but farther from the back side than in the collapsed closed position, and an open position wherein an inside of the base is exposed;
wherein the lid maintains itself in the expanded closed position such that an opening exists between the lid and the base that is large enough for an electrical cord to extend through when the lid is at the expanded closed position.

20. A method of using an electrical device cover, the method comprising:
mounting a base to an electrical box, the base comprising an opening in a back side large enough to receive an electrical device, the base further comprising a first base end;
hingedly coupling a first lid end to the first base end through a hinge;
hingedly moving the lid in relation to the base from a collapsed closed position to an expanded closed position wherein a second lid end is immediately adjacent the base but farther from the back side than in the collapsed closed position; and
self-maintaining the lid in the expanded closed position.

21. The method of claim 20 further comprising pivoting the lid through the hinge to the collapsed closed position, selectively adjusting the first lid end toward a second base end, and simultaneously seating a lid pin in a notch on a base wall when the first lid end is selectively adjusted toward the second base end.

22. The method of claim 20 further comprising locking the lid into the expanded closed position using a locking tab that extends away from the base.

23. The method of claim 22 further comprising adjusting the locking tab from an expanded closed position to a collapsed closed position.

24. The method of claim 23 further comprising adjusting the locking tab by rotating the locking tab between the expanded closed position and the collapsed closed position.

25. The method of claim 23 further comprising adjusting the locking tab by sliding the locking tab along a channel in the base.

* * * * *